US007870134B2

(12) United States Patent
Brueckner (10) Patent No.: US 7,870,134 B2
(45) Date of Patent: Jan. 11, 2011

(54) AGENT-BASED CLUSTERING OF ABSTRACT SIMILAR DOCUMENTS

(75) Inventor: Sven Brueckner, Dexter, MI (US)

(73) Assignee: NewVectors LLC, Ann Arbor, MI (US)

( * ) Notice: Subject to any disclaimer, the term of this patent is extended or adjusted under 35 U.S.C. 154(b) by 926 days.

(21) Appl. No.: 10/929,213

(22) Filed: Aug. 30, 2004

(65) Prior Publication Data

US 2005/0086253 A1 Apr. 21, 2005

Related U.S. Application Data

(60) Provisional application No. 60/498,566, filed on Aug. 28, 2003.

(51) Int. Cl.
*G06F 7/00* (2006.01)
*G06F 17/30* (2006.01)

(52) U.S. Cl. ..................................... 707/737; 707/749
(58) Field of Classification Search .................. 707/101
See application file for complete search history.

(56) References Cited

U.S. PATENT DOCUMENTS

| 5,623,404 | A * | 4/1997 | Collins et al. ................... 705/9 |
| 5,940,832 | A * | 8/1999 | Hamada et al. ............. 707/100 |
| 6,338,065 | B1 * | 1/2002 | Takahashi et al. ............. 707/10 |
| 6,360,227 | B1 * | 3/2002 | Aggarwal et al. ........... 707/102 |
| 6,446,061 | B1 * | 9/2002 | Doerre et al. ................... 707/3 |
| 6,654,739 | B1 * | 11/2003 | Apte et al. ....................... 707/5 |
| 6,760,763 | B2 * | 7/2004 | Jennings et al. ............... 707/10 |
| 6,988,105 | B2 * | 1/2006 | Houston et al. ............. 707/100 |
| 7,149,732 | B2 * | 12/2006 | Wen et al. ....................... 707/4 |
| 7,152,065 | B2 * | 12/2006 | Behrens et al. ................. 707/5 |
| 2002/0042793 | A1 * | 4/2002 | Choi ............................. 707/6 |
| 2002/0052898 | A1 * | 5/2002 | Schilit et al. ................. 707/530 |
| 2002/0055919 | A1 * | 5/2002 | Mikheev ......................... 707/3 |
| 2003/0172063 | A1 * | 9/2003 | Gutta et al. ..................... 707/5 |
| 2004/0090472 | A1 * | 5/2004 | Risch et al. ................. 345/853 |
| 2004/0205454 | A1 * | 10/2004 | Gansky et al. .............. 715/500 |

OTHER PUBLICATIONS

"Agent", ComputerUser Dictionary, www.computeruser.com.*
"Cluster Analysis", StatSoft, 2000.*
Document clustering, 2004, pp. 1-3.*

* cited by examiner

*Primary Examiner*—Cam Y T Truong
(74) *Attorney, Agent, or Firm*—Gifford, Krass, Sprinkle, Anderson & Citkowski, P.C.

(57) ABSTRACT

A continuous, emergent, anytime process clusters input documents according to a similarity function within a node-based, distributed computing environment, for example, within a client/server environment. An agent (DAg) assigned to each document determines whether its document should remain at a node or be moved to another node to increase similarity clustering. An agent (SAg) assigned to each node may be operative to manage storage requirements within its node, and/or manage communications between the nodes of the environment as the DAgs operate. Typically a move request is issued to another node if it is determined that clustering would increase by moving a document to that node. In such an instance, the SAg assigned to that other node would probabilistically consider the move request in view of other such requests in sequence to avoid overloading. To enhance performance, documents may be preprocessed and given values representative of similarity. The similarity between two arbitrary documents may then assessed as the average difference between the values assigned to the same attribute in the two documents.

11 Claims, 7 Drawing Sheets

Fig - 6, con't

AGENT-BASED CLUSTERING OF ABSTRACT SIMILAR DOCUMENTS

REFERENCE TO RELATED APPLICATION

This application claims priority from U.S. Provisional Patent Application Ser. No. 60/498,566, filed Aug. 28, 2003, the entire content of which is incorporated herein by reference.

FIELD OF THE INVENTION

This invention relates generally to information processing and, in particular, to a method of clustering similar documents using agents within a node-based, distributed computing environment.

BACKGROUND OF THE INVENTION

Researchers are increasingly faced with the problem of searching a large network of databases with a massive amount of documents with highly variable content for a very small subset of information that matches the current interest of the analyst. Given the physical constraints of the available infrastructure, and the inability to reasonably funnel all documents through a central filter, distributed search mechanisms based on efficient heuristics have to be applied.

There exists a formal proof that any heuristic search mechanism on average performs only as well as a random search if no assumptions about the structure of the underlying search space can be made. This is due to the fact that a heuristic approach essentially determines the order in which the space is searched, with the hope that the solution is located in the higher-valued region of the search space. If the structure of the space is not known, then this hope is unfounded.

Since one cannot make any assumption regarding the structure of the space in the search for documents that match an analyst's interest, any heuristics-based search may potentially be very inefficient. One can hope to improve the efficiency of the search by either learning more about the underlying document domain (e.g., document assignments among branches of intelligence services), or more generally, structure the search space to design a heuristic that performs well on this structure.

Despite ongoing improvements in this area, the need remains for a more efficient process for searching databases and analyzing abstract documents to identify desirable information on a timely basis.

SUMMARY OF THE INVENTION

This invention resides a continuous, emergent, anytime process that clusters input documents according to a similarity function that is independent of any specific interest of a particular analyst. In the preferred embodiment, the process clusters references to documents, thereby facilitating abstract analysis to identify useful and important information.

The method preferably operates within a node-based, distributed computing environment, for example, in a client/server environment. According to the invention, an agent (DAg) is assigned to each document, each DAg being operative to determine whether its document should remain at a node or be moved to another node to increase similarity clustering. Each DAg preferably probabilistically decides whether a move to another server would increase clustering within the environment. The DAgs then operate so that similar documents are clustered at various nodes within the environment.

In the preferred embodiment, an agent (SAg) is assigned to each node, each SAg being operative to manage resources within the computing environment as the DAgs operate. For example, each SAg may be operative to manage storage requirements within its node, and/or manage communications between the nodes of the environment as the DAgs operate.

Typically a move request is issued to another node if it is determined that clustering would increase by moving a document to that node. In such an instance, the SAg assigned to that other node would probabilistically consider the move request in view of other such requests in sequence to avoid overloading.

To enhance performance, documents may be preprocessed and given values representative of similarity. The similarity between two arbitrary documents may then assessed as the average difference between the values assigned to the same attribute in the two documents.

DETAILED DESCRIPTION OF THE INVENTION

This invention is directed to a method of clustering similar documents using agents within a node-based, distributed computing environment. The approach may be demonstrated in a graph whose nodes are capacity-restricted document servers, and whose edges represent bandwidth-restricted communication links among these servers. We speculate that the graphs of real-world server networks may have small-world characteristics, in which most servers are primarily locally connected, while including a few high-bandwidth connections between selected representatives of these local clusters.

According to this invention, each server is assigned an autonomous agent (Server-Agent: "SAg") whose goal it is to prevent the server as well as its connections to other servers from being overloaded with data as documents are clustered.

There exist several models of autonomous processes that exhibit emergent clustering functionality. For example, ants in their colonies sort their brood through probabilistic pick-up and drop-off actions. Thus, the objects that are sorted are independent of the instigators of the sorting process. The same is true for card games, in which players trade cards to achieve certain patterns (e.g., all four colors of the same type).

Further in accord with the invention, we merge the instigator and the object of the clustering process into the same entity. We assign an agent to each document in the system (Document-Agent: "DAg"). It is this agent's goal to locate its document at a server that has many other similar documents. We assume that our documents are already preprocessed, and that an abstract characterization of the document has been created.

Figure 1:
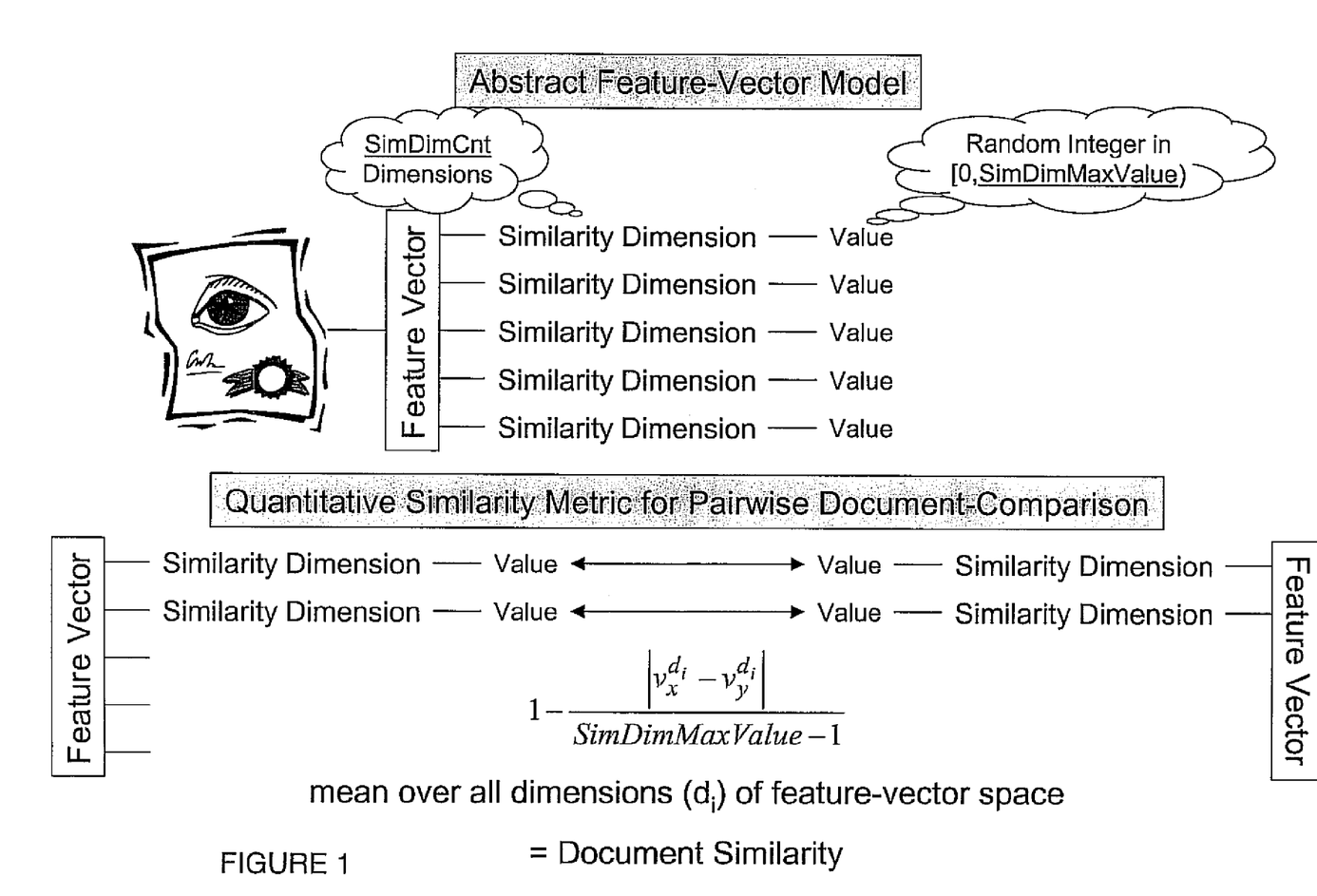
FIG. 1 shows the use of an abstract feature-vector model and quantitative similarity metric to determine document similarities.
Figure 2:
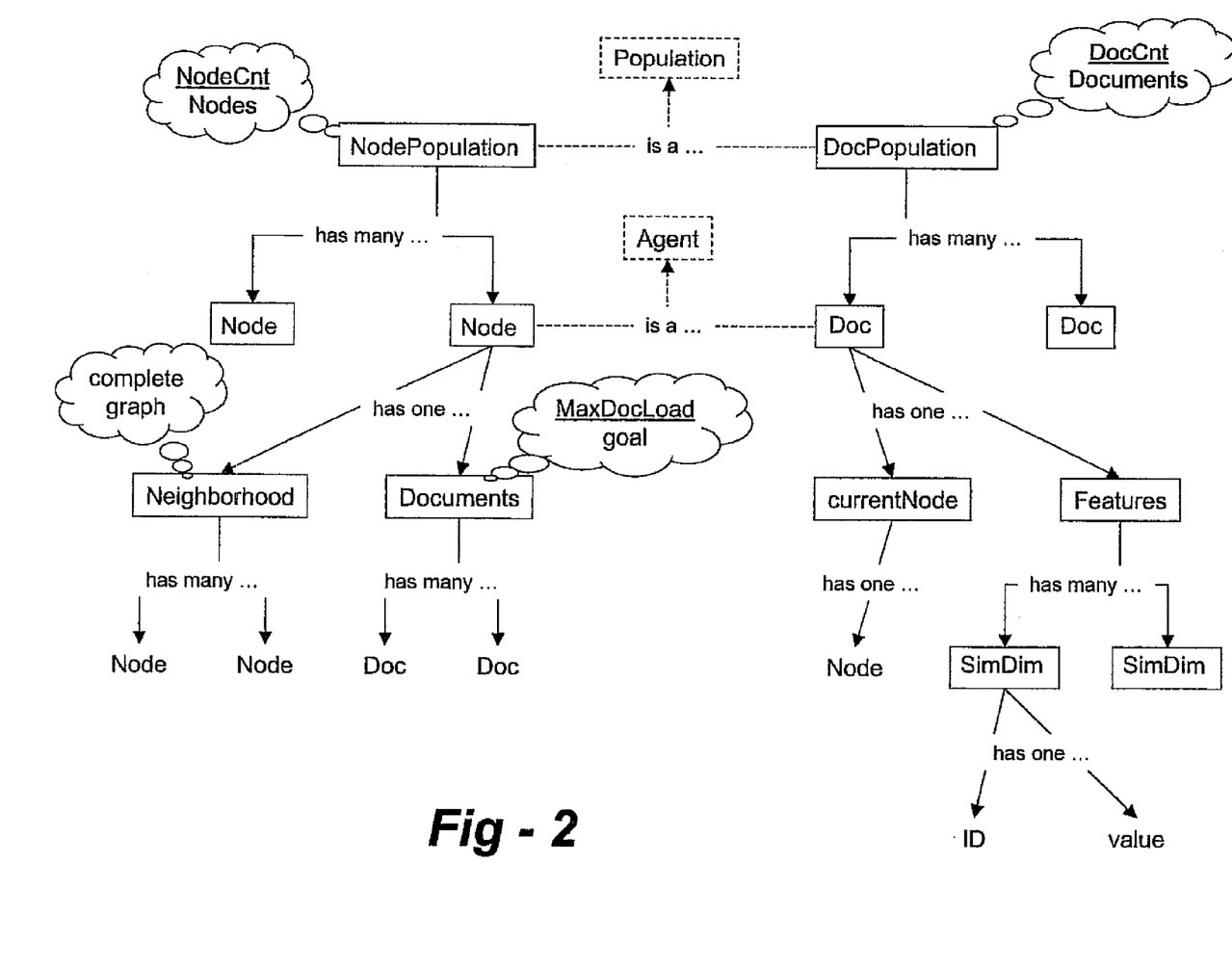
FIG. 2 presents an agent model.

The characterization of a document according to the invention is a set of attributes (slots in a multi-dimensional vector), which are all assigned values from finite domains. We choose the values from the set of natural numbers within the range of zero to a maximum number, which is a model parameter. FIG. 1 shows the use of an abstract feature-vector model and quantitative similarity metric to determine document similarities. FIG. 2 presents an agent model.

In the clustering process, we assess the similarity of two arbitrary documents as the average difference between the values assigned to the same attribute in the two documents. The closer the values in the slots are to each other, the more similar are the documents. This metric is completely abstract and not directly related to any commonly used document comparison metrics. However, it permits us to randomly generate document sets and execute systematic simulation experiments.

Process Description

Figure 3:
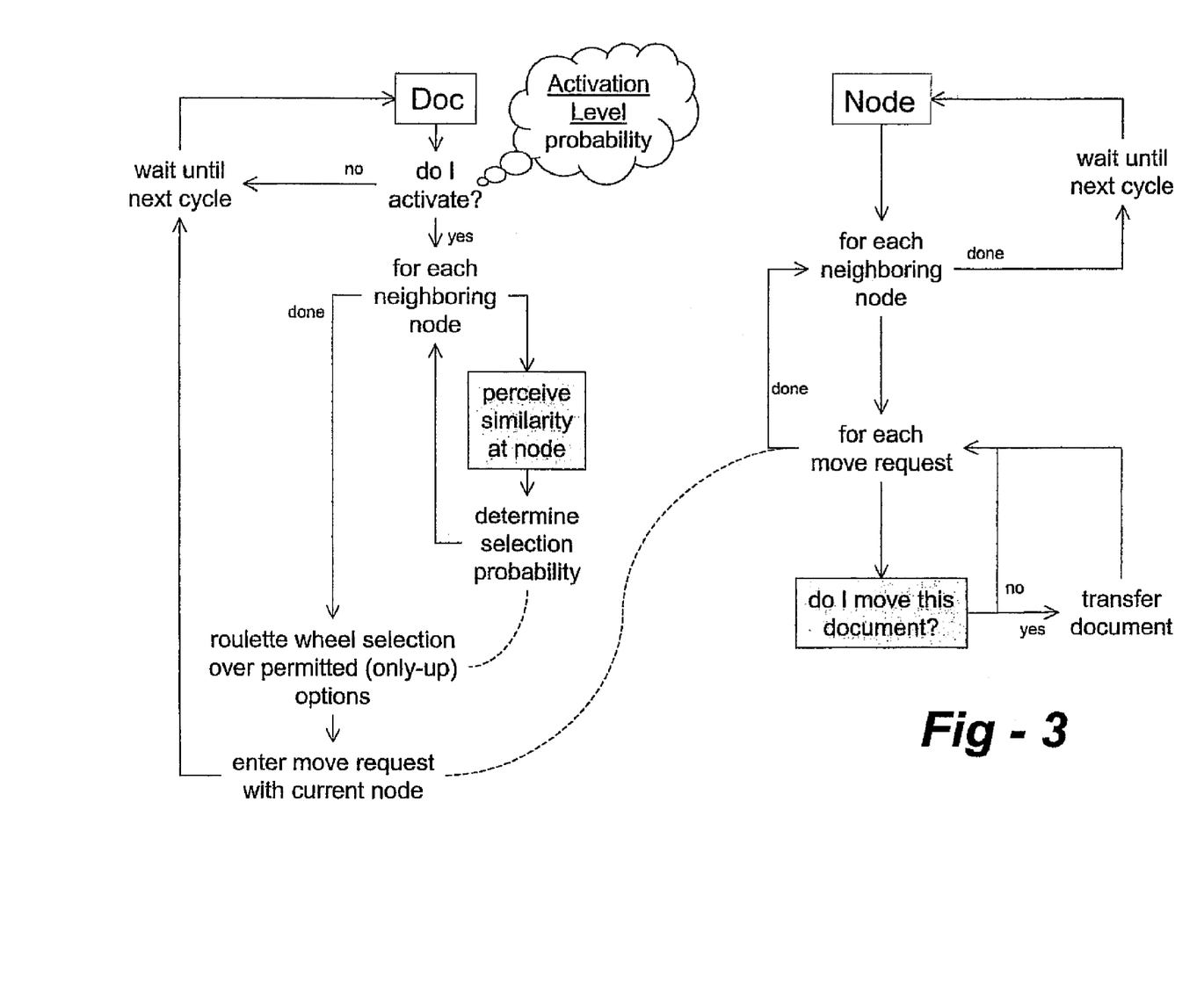
FIG. 3 shows how nodes and documents act concurrently.
Figure 4:
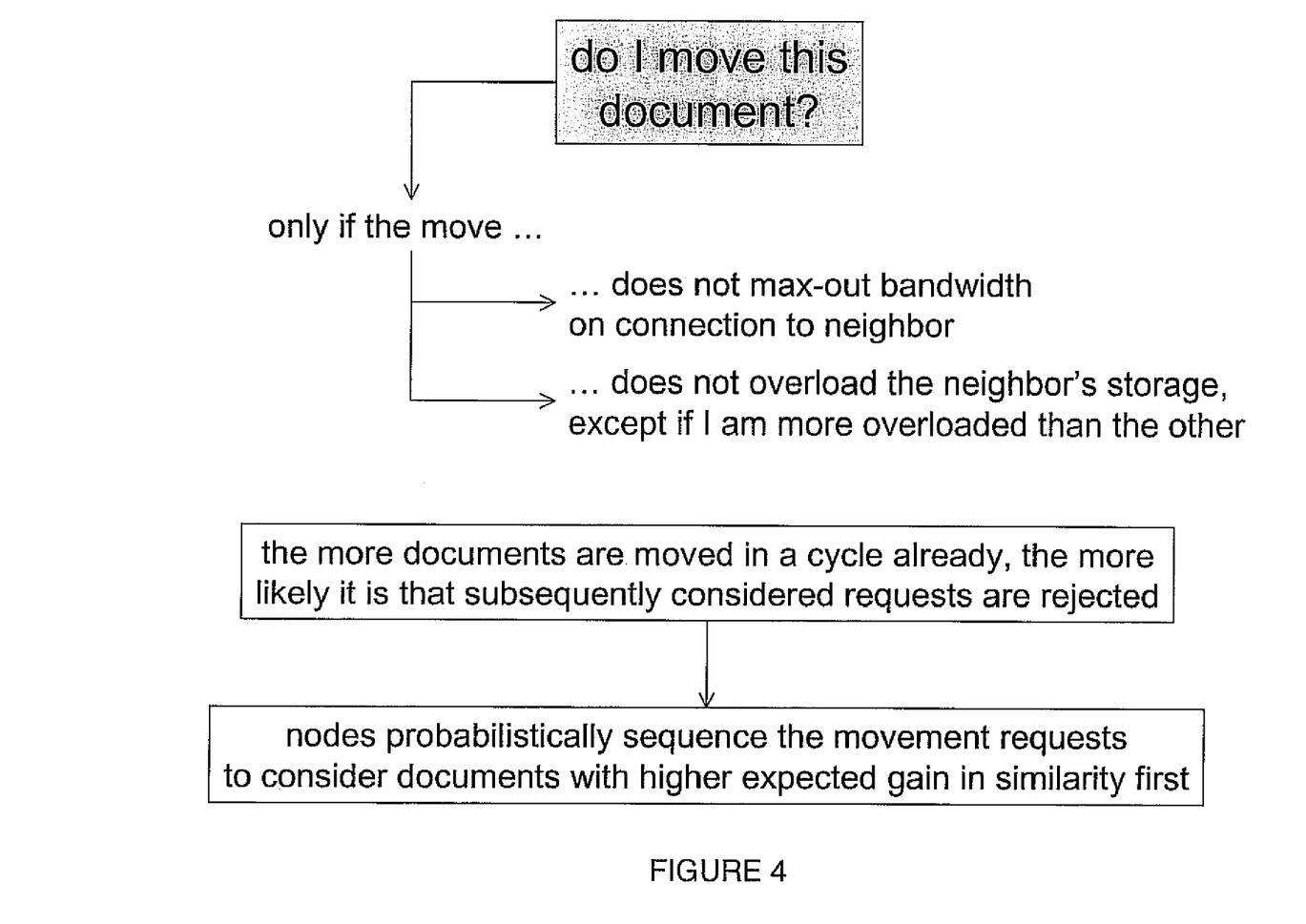
FIG. 4 shows how communications and storage loads are balanced in accordance with the invention.

The autonomous agents representing the documents interact in the shared environment of the server network in which each node (server) also is an active entity, capable of modifying its local environment. The goal of the DAg population (to increase document similarity on local server) and of the SAg population (to limit the use of storage and bandwidth resources in the network) may lead to a tension that balances the clustering dynamics. Thus, both populations are involved in the decision process that determines the potential relocation of documents to other servers. FIG. 3 shows how nodes and documents act concurrently. FIG. 4 shows how communications and storage loads are balanced in accordance with the invention.

From the perspective of a single document, the process runs as follows:

1) The document's DAg assesses the average document similarity at the current location of the document—mean over similarity of document with other documents occupying the same server—and at the servers connected to the current location.

2) The DAg probabilistically decides whether a move to another server would further its goal of being co-located with many other highly similar documents.

3) If a move is decided, the DAg puts a move request into the decision queue of the current server's agent.

4) The SAg probabilistically selects the next move request to be processed. The selection probability of a request is proportional to the gain in similarity that the document would experience through the move (information provided by the DAg).

5) The SAg grants the move request if the move would not overload the receiving server or the bandwidth available between the two servers.

The agents continuously execute their respective decision cycles, which increases the average similarity of documents (pair-wise comparison) at the individual servers while enforcing the constraints on the resource usage in the system.

Figure 5:
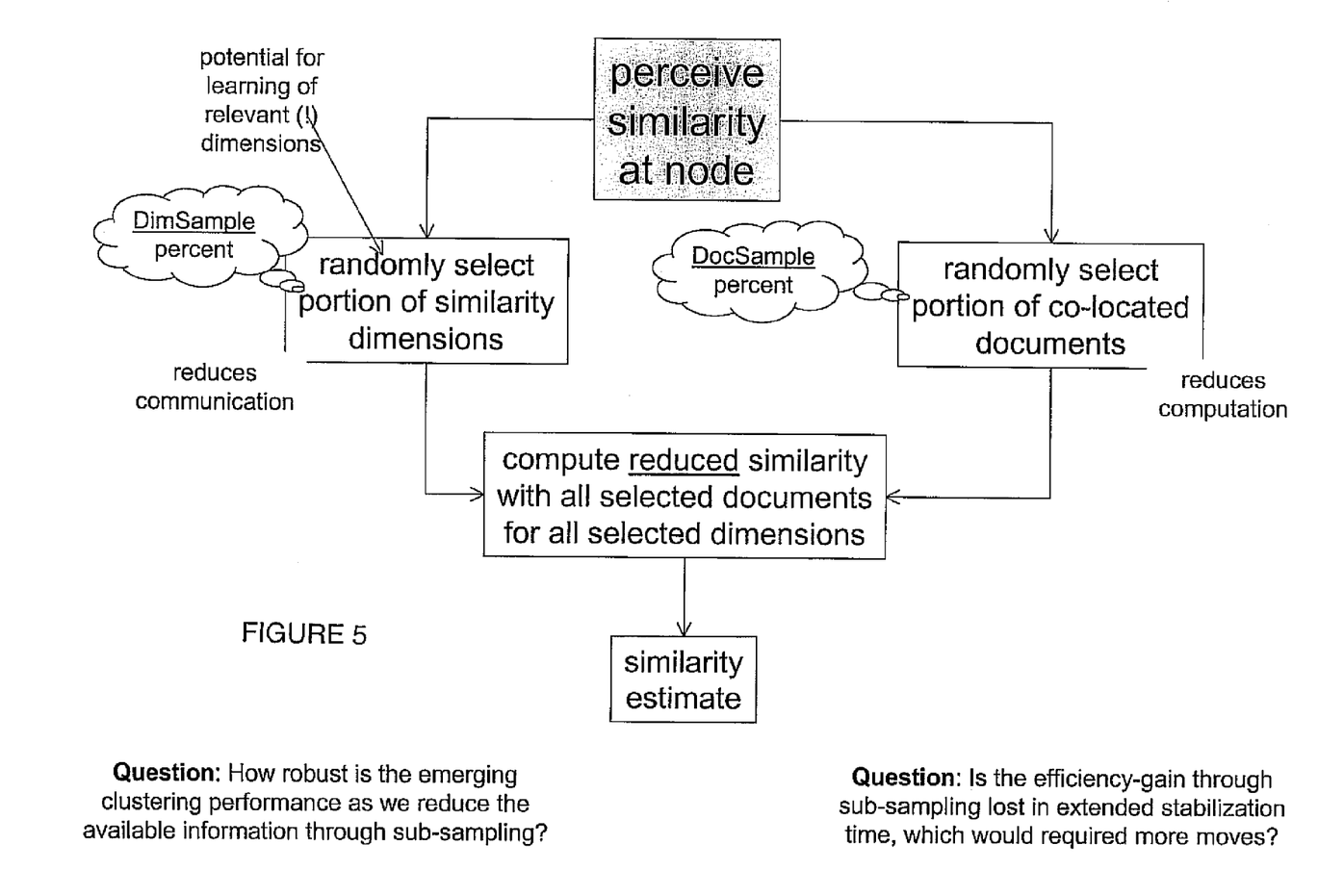
FIG. 5 illustrates the increase in efficiency made possible through sub-sampling.

The activity of the agents uses various processing and communication resources. Each decision cycle of a DAg requires the communication of document information to neighboring servers and the processing of this information as the local similarity is assessed. Our experiments show that we can reduce the use of these resources, while maintaining high sorting quality and speed, by sub-sampling the set of neighboring servers, the set of documents located at a server, and/or the set of attributes describing a document. Consequently, rather than considering all neighboring servers, the agent randomly selects only some for comparison; rather than comparing its document, only a subset contributes to the average similarity estimate; and rather than comparing the values of all attributes that describe a document, the DAg chooses a subset. FIG. 5 illustrates the increase in efficiency made possible through sub-sampling.

We find that sub-sampling of neighbors, documents, and document descriptors yield relatively robust performance (slow decline for linear increase of sub-sampling) until a critical value is reached, below which the clustering process breaks down. We also find that the location of this critical transition point depends on the size of the document base and the server network, so that larger sets of documents and networks permit more aggressive sub-sampling.

Graphical User Interface

In the preferred embodiment, the emergent clustering mechanism is implemented in a simulation that can be flexibly configured for a wide variety of configurations (number of documents, number of servers, number of attributes describing a document, size of domain for these attributes, degree of sub-sampling of servers, documents and attributes, etc). The simulation is integrated into a parameter sweep infrastructure that allows us to systematically explore the emerging system-level dynamics across arbitrarily defined ranges in parameter space.

Figure 6:
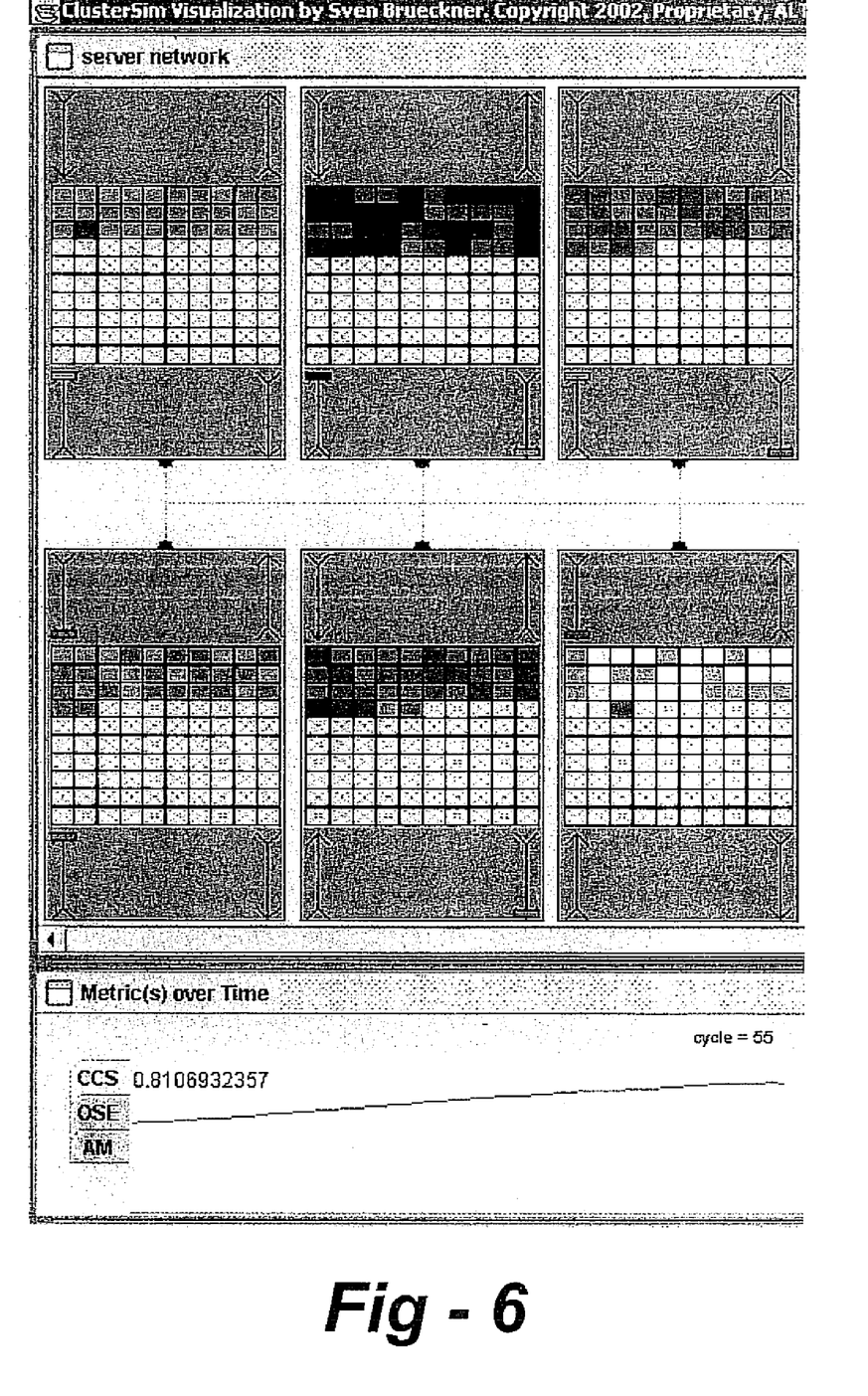
FIG. 6 shows a graphical interface that permits a user to change selected parameters at runtime and observe the effect on the clustering of documents.

FIG. 6 shows a graphical interface that permits the user to change selected parameters at runtime and observe the effect on the clustering of documents. We enhanced the simulated scenario to include a continuous flow of documents into and out of the server network, which acts as a disorganizing force competing with the emergent clustering. As a result, we can observe a continuous process through the interface, rather than a one-time experiment.

The user interface displays a specific scenario, where we have 10 fully connected servers with a maximum storage capacity (i.e., 100 documents per server). We randomly generate 300 documents, which are characterized by three attributes, whose values define the intensity of the red, green, and blue coloring of the respective document in the display. Thus, the interface restricts the space of potential experiments that a user can perform compared to the space that can be explored with the parameter sweep infrastructure.

The interface provides a number of input elements (sliders) through which the user may change the current setting of problem or solution parameters. For instance, the user is permitted to reduce the storage capacity of the servers, the bandwidth of the communication network, the volume of the flow of documents into and out of the network, or the degree of sub-sampling in the decision process. The interface also displays time-dependent metrics such as the current document similarity at an average server, or the volume of document traffic or the server network.

I claim:

1. A method of clustering documents in terms of similarity within a node-based, distributed computing environment, comprising the steps of:

inputting a plurality of documents;

preprocessing the documents by assigning values representative of attributes associated with the documents;

assigning an agent (DAg) to each document, each DAg being operative to compare the values assigned to the DAg's document with the values assigned to other documents to determine whether the DAg's document should be clustered at a current node because the DAg's document is similar to documents at the current node, or whether the DAg's document should be moved and clustered with documents at another node;

assigning an agent (SAg) to each node, each SAg being operative to manage resources within the computing environment as the DAgs cluster the documents at the nodes; and displaying the results of the clustering to a user through a graphical user interface (GUI).

2. The method of claim 1, wherein each SAg being operative to manage storage requirements within the DAg's node as the DAgs operate.

3. The method of claim 1, wherein each SAg being operative to manage communications between the nodes of the environment as the DAgs operate.

4. The method of claim 1, wherein each DAg probabilistically decides whether a move to another server would increase clustering within the environment.

5. The method of claim 1, further including the step of issuing a move request to another node if clustering would increase by moving a document to that node.

6. The method of claim 1, further including the steps of:
issuing a move request to another node if clustering would increase by moving a document to that node; and
assigning an agent (SAg) to the other node, the SAg being operative to probabilistically consider move requests in sequence.

7. The method of claim 1, including the step of preprocessing documents and assigning values representative of their similarity.

8. The method of claim 1, including the steps of:
preprocessing documents and assigning values representative of their similarity; and
assessing the similarity between two arbitrary documents as the average difference between the values assigned to the same attribute in the two documents.

9. A method of clustering similar documents within a client-server environment, comprising the steps of:
assigning an agent (DAg) to each document, each DAg being preprogrammed to increase document similarity on a local server;
assigning an agent (SAg) to each local server in the environment, each SAg being preprogrammed to limit the use of storage at that server or connections to other servers as the documents are clustered; and wherein:
a) each DAg probabilistically decides whether a move to another server would further the goal of each DAg and, if so, generates a move request to the local SAg, and
b) the local SAg probabilistically considers move requests in sequence, and grants those requests in furtherance of the goal of the local SAg.

10. The method of claim 9, wherein documents are preprocessed and given values representative of similarity.

11. The method of claim 10, wherein the similarity between two arbitrary documents is assessed as the average difference between the values assigned to the same attribute in the two documents.

* * * * *